United States Patent
Varde et al.

(10) Patent No.: US 12,112,178 B2
(45) Date of Patent: Oct. 8, 2024

(54) MEMORY-INDEPENDENT AND SCALABLE STATE COMPONENT INITIALIZATION FOR A PROCESSOR

(71) Applicant: Intel Corporation, Santa Clara, CA (US)

(72) Inventors: Abhimanyu Kanaiya Varde, Portland, OR (US); Karuna Ramkumar, Hillsboro, OR (US); Robert Valentine, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 17/134,322

(22) Filed: Dec. 26, 2020

(65) Prior Publication Data

US 2022/0206825 A1 Jun. 30, 2022

(51) Int. Cl.
*G06F 9/44* (2018.01)
*G06F 9/30* (2018.01)
*G06F 9/445* (2018.01)

(52) U.S. Cl.
CPC ...... *G06F 9/44505* (2013.01); *G06F 9/30098* (2013.01); *G06F 9/30145* (2013.01)

(58) Field of Classification Search
None
See application file for complete search history.

(56) References Cited

U.S. PATENT DOCUMENTS

| | | | | |
|---|---|---|---|---|
| 5,781,745 A | * | 7/1998 | Ramelson | G06F 13/387 709/225 |
| 5,943,689 A | * | 8/1999 | Tamer | G06F 3/0632 711/166 |
| 7,155,586 B1 | * | 12/2006 | Wagner | G06F 12/0873 711/E12.019 |
| 2003/0004918 A1 | * | 1/2003 | Chang | G06F 9/52 |
| 2003/0225982 A1 | * | 12/2003 | Fujita | G06F 3/0622 711/170 |
| 2012/0303322 A1 | * | 11/2012 | Rego | G06F 11/3495 702/182 |
| 2016/0275025 A1 | * | 9/2016 | Accapadi | G06F 9/4881 |
| 2017/0300323 A1 | * | 10/2017 | Pattnaik | G06F 11/3003 |
| 2019/0087566 A1 | * | 3/2019 | Hosie | G06F 21/54 |
| 2020/0233672 A1 | * | 7/2020 | Winrow | G06F 9/30145 |
| 2020/0409847 A1 | * | 12/2020 | Gabor | G06F 12/1009 |
| 2021/0103584 A1 | * | 4/2021 | Fretz | G06F 16/24553 |

* cited by examiner

*Primary Examiner* — Danny Chan
(74) *Attorney, Agent, or Firm* — Fletcher Yoder, P.C.

(57) ABSTRACT

Systems or methods of the present disclosure may provide an initialization technique that enables the initialization of multiple states in an efficient manner. The initialization technique includes a register to track usage of state components of the processor and a decode unit to decode a state initialization instruction. The state initialization instruction indicates that of the state components are to be initialized. The initialization technique also includes an execution unit coupled with the decode unit. The execution unit, in response to the state initialization instruction, is to initialize the state components without reading another state component from memory as part of the initialization.

17 Claims, 13 Drawing Sheets

MEMORY-INDEPENDENT AND SCALABLE STATE COMPONENT INITIALIZATION FOR A PROCESSOR

BACKGROUND

The present disclosure relates generally to initialization processes to initialization (INIT) state components of a processor storing respective states. More particularly, the present disclosure relates to memory independent INIT processes to reset to an initialization condition for one or more state components.

When a processor, system on chip (SoC), and/or electronic device starts up, one or more state components and/or registers of the processor, SoC, and/or the electronic device may start in an INIT state. Once the state components are changed, the registers change. However, persistent data in these registers may cause the data to be vulnerable to other users and/or threads. For example, during a context switch, an operating system (OS) and a virtual machine manager (VMM) may be susceptible to leakage of state information to a different process/virtual machine. Additionally, having residual data from one software thread to another during context switches may give malicious threads access to sensitive data. This vulnerability via residual information may also be present in virtual processors (VP) context switches by the VMM.

Furthermore, storing the data in these states for extended duration where the data is not used consumes power and may reduce performance. For example, execution of certain instructions may incur performance penalties if other state components are in a non-INIT state. For example, having dirty (i.e., changed from an INIT state) AVX registers while streaming single instruction, multiple data (SIMD) extension (SSE) instructions may take longer to complete than executing the same instructions in a 128-bit AVX version.

Accordingly, software running on the processors or the SoCs may be placed in extended INIT states (e.g., in a register file) at a time of startup/reset of the processor and/or the electronic device that includes the processor. The reset to an initialization condition of state components may be performed for security purposes. However, mechanisms to reset to an initialization condition for the state components may be limited. For example, the processors or SoCs may reset to an initialization condition for the state components by storing state components, clearing bits for state components to reset to an initialization condition, and restoring the non-INIT state components by reading the state component bits from memory. However, this read from memory may take a large portion of the reset process duration. Alternatively, state-specific initialization processes may be used, but these initialization processes utilize specific instructions for each state component without the flexibility to be applied to future occurring state components and/or to be applied to multiple state components concurrently. Additionally or alternatively, the state-specific initialization processes may leave an in-use flag (e.g., XINUSE) in a stale state that may not track that the state components have been placed in INIT conditions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION OF THE DRAWINGS

Various aspects of this disclosure may be better understood upon reading the following detailed description and upon reference to the drawings in which.

DETAILED DESCRIPTION OF THE EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Register Architecture

Figure 1:
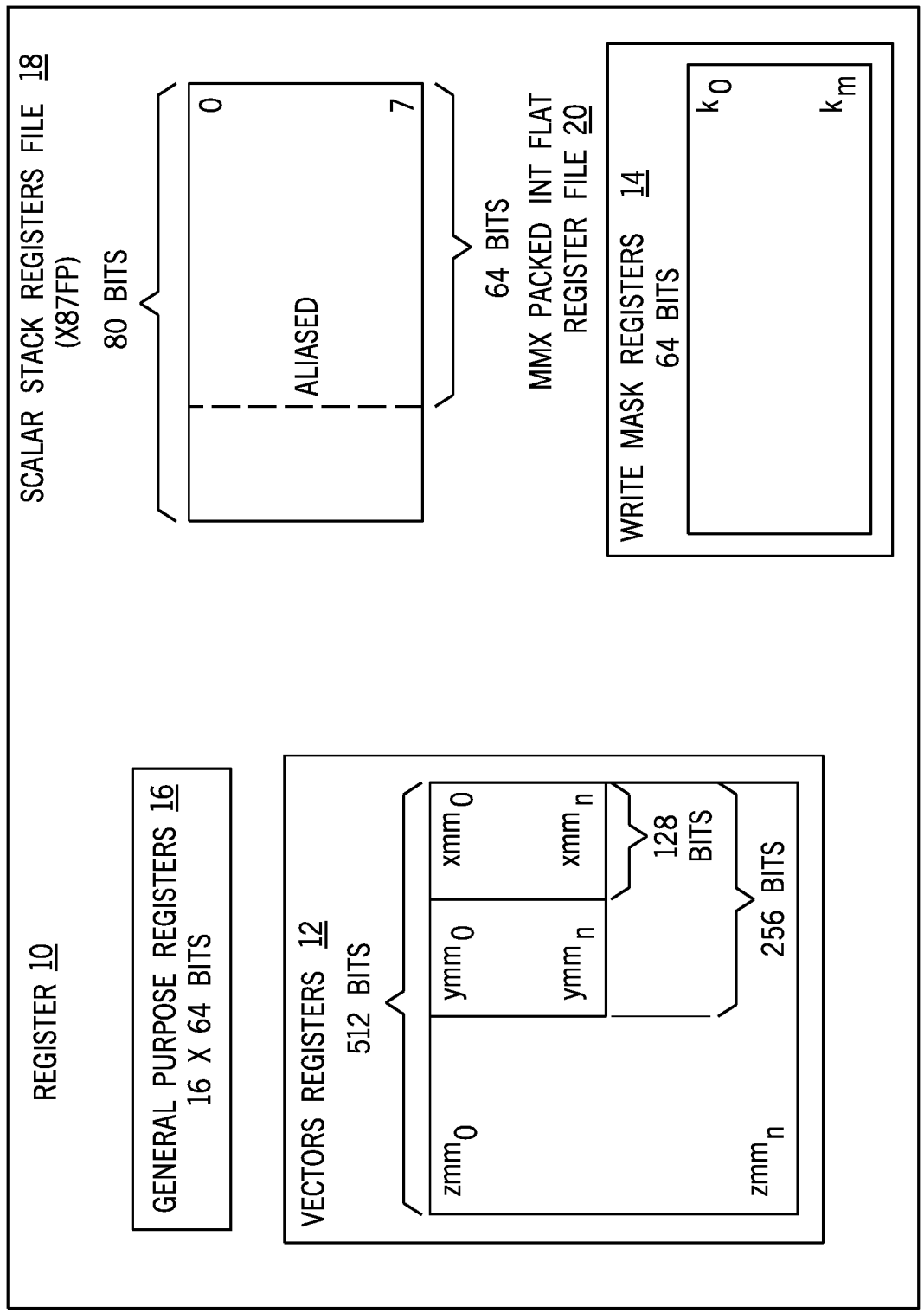
FIG. 1 is a block diagram of a register, in accordance with an embodiment of the present disclosure.

FIG. 1 is a block diagram of a register 10, in accordance with an embodiment of the present disclosure. In the embodiment illustrated, there are a number (e.g., 32) of vector registers 12 that may be a number (e.g., 512) of bits wide. In the register 10; these registers are referenced as zmm0 through $zmm_i$. The lower order (e.g., 256) bits of the lower n (e.g., 16) zmm registers are overlaid on corresponding registers ymm. The lower order (e.g., 128 bits) of the lower n zmm registers that are also the lower order n bits of the ymm registers are overlaid on corresponding registers xmm.

Write mask registers 14 may include m (e.g., 8) write mask registers (k0 through km), each having a number (e.g., 64) of bits. Additionally or alternatively, at least some of the write mask registers 14 may have a different size (e.g., 16 bits). At least some of the vector mask registers 12 (e.g., k0) are prohibited from being used as a write mask. When such vector mask registers are indicated, a hardwired write mask (e.g., 0xFFFF) is selected and, effectively disabling write masking for that instruction.

General-purpose registers 16 may include a number (e.g., 16) of registers having corresponding bit sizes (e.g., 64) that are used along with x86 addressing modes to address memory operands. These registers may be referenced by the names RAX, RBX, RCX, RDX, RBP, RSI, RDI, RSP, and R8 through R15. Additionally or alternatively, these general purpose registers 16 may include EDX:EAX. EDX:EAX means that 32 bits of EDX and the 32 bits of EAX are concatenated together to form a 64-bit register. Parts (e.g., 32 bits of the registers) of at least some of these registers may be used for modes (e.g., 32-bit mode) that is shorter than the complete length of the registers.

Scalar floating-point stack register file (x87 stack) 18 has an MMX packed integer flat register file 20 is aliased. The x87 stack 18 is an eight-element (or other number of elements) stack used to perform scalar floating-point operations on floating point data using the x87 instruction set extension. The floating-point data may have various levels of precision (e.g., 16, 32, 64, 80, or more bits). The MMX packed integer flat register files 20 are used to perform operations on 64-bit packed integer data, as well as to hold operands for some operations performed between the MMX packed integer flat register files 20 and the XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core suitable for general-purpose computing; 2) a high performance general purpose out-of-order core suitable for general-purpose computing; 3) a special purpose core suitable for primarily for graphics and/or scientific (throughput) computing. Implementations of different processors may include: 1) a CPU including one or more general purpose in-order cores suitable for general-purpose computing and/or one or more general purpose out-of-order cores suitable for general-purpose computing; and 2) a coprocessor including one or more special purpose cores primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In-Order and Out-of-Order Core Architecture

Figure 2:
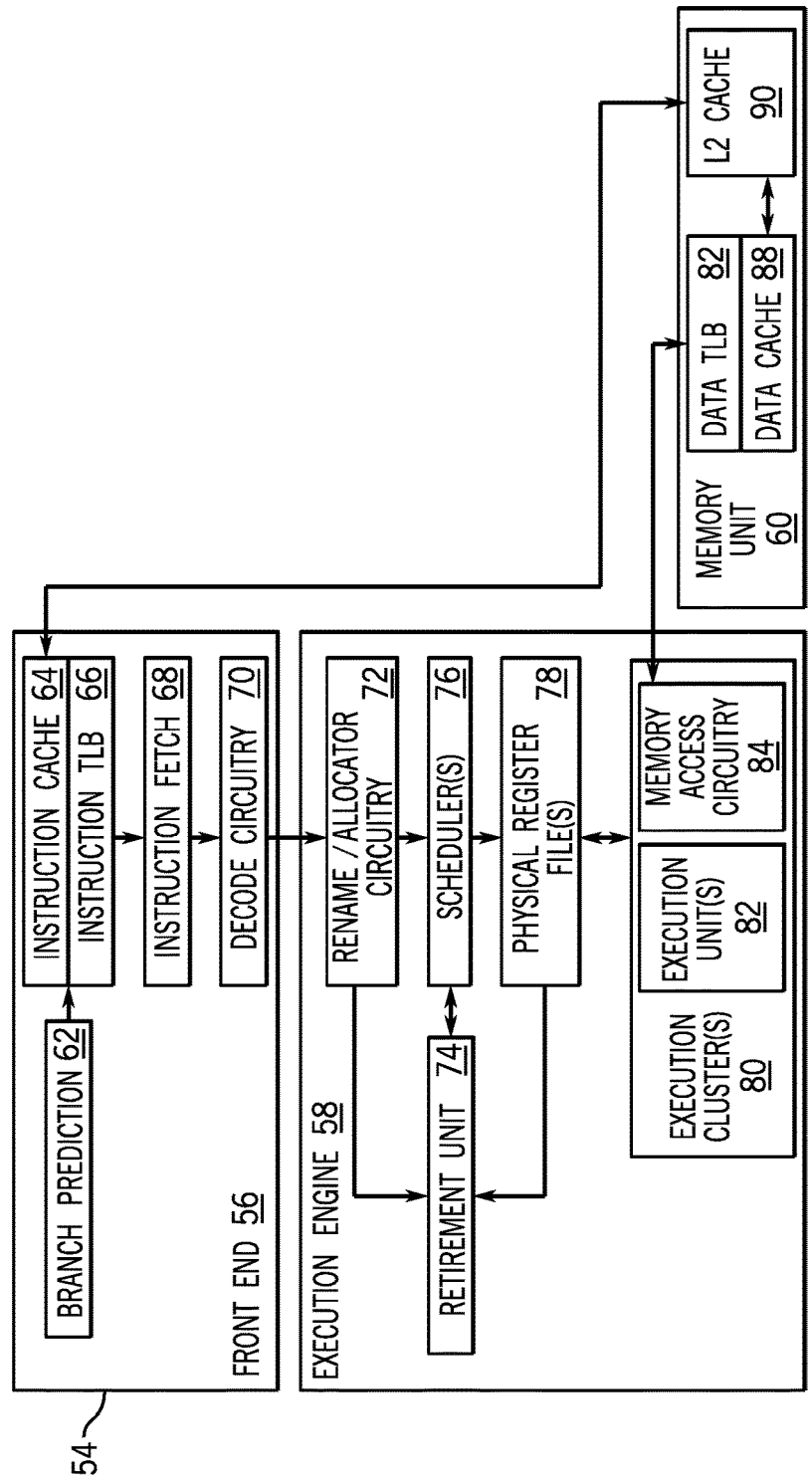
FIG. 2A is a block diagram illustrating an in-order pipeline and a register renaming, out-of-order issue/execution pipeline, in accordance with an embodiment of the present disclosure.
FIG. 2B is a block diagram illustrating an in-order architecture core and a register renaming, out-of-order issue/execution architecture core to be included in a processor, in accordance with an embodiment of the present disclosure.

FIG. 2A is a block diagram illustrating an in-order pipeline and a register renaming, out-of-order issue/execution pipeline according to an embodiment of the disclosure. FIG. 2B is a block diagram illustrating both an embodiment of an in-order architecture core and an exemplary register renaming, out-of-order issue/execution architecture core to be included in a processor according to embodiments. The solid lined boxes in FIGS. 2A and 2B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 2A, a pipeline 30 in the processor includes a fetch stage 32, a length decode stage 34, a decode stage 36, an allocation stage 38, a renaming stage 40, a scheduling (also known as a dispatch or issue) stage 42, a register read/memory read stage 44, an execute stage 46, a write back/memory write stage 48, an exception handling stage 50, and a commit stage 52.

FIG. 2B shows a processor core 54 including a front-end unit 56 coupled to an execution engine unit 58, and both are coupled to a memory unit 60. The processor core 54 may be a reduced instruction set computing (RISC) core, a complex instruction set computing (CISC) core, a very long instruction word (VLIW) core, or a hybrid or alternative core type. As yet another option, the processor core 54 may be a special-purpose core, such as, for example, a network or communication core, compression engine, coprocessor core, general purpose computing graphics processing unit (GPGPU) core, graphics core, or the like.

The front-end unit 56 includes a branch prediction unit 62 coupled to an instruction cache unit 64 that is coupled to an instruction translation lookaside buffer (TLB) 66. The TLB 66 is coupled to an instruction fetch unit 68. The instruction fetch unit 68 is coupled to a decode circuitry 70. The decode circuitry 70 (or decoder) may decode instructions and generate as an output one or more micro-operations, micro-code entry points, microinstructions, other instructions, or other control signals, which are decoded from, or which otherwise reflect, or are derived from, the original instructions. The decode circuitry 70 may be implemented using various different mechanisms. Examples of suitable mechanisms include, but are not limited to, look-up tables, hardware implementations, programmable logic arrays (PLAs), microcode read only memories (ROMs), etc. The processor core 54 may include a microcode ROM or other medium that stores microcode for macroinstructions (e.g., in decode circuitry 70 or otherwise within the front-end unit 56). The decode circuitry 70 is coupled to a rename/allocator unit 72 in the execution engine unit 58.

The execution engine unit 58 includes a rename/allocator unit 72 coupled to a retirement unit 74 and a set of one or more scheduler unit(s) 76. The scheduler unit(s) 76 represents any number of different schedulers, including reservations stations, central instruction window, etc. The scheduler unit(s) 76 is coupled to physical register file(s) unit(s) 78. Each of the physical register file(s) unit(s) 78 represents one or more physical register files storing one or more different data types, such as scalar integers, scalar floating points, packed integers, packed floating points, vector integers, vector floating points, statuses (e.g., an instruction pointer that is the address of the next instruction to be executed), etc. In one embodiment, the physical register file(s) unit(s) 78 includes the vector registers 12, the write mask registers 14, and/or the x87 stack 18. These register units may provide architectural vector registers, vector mask registers, and general-purpose registers. The physical register file(s) unit(s) 78 is overlapped by the retirement unit 74 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.).

The retirement unit 74 and the physical register file(s) unit(s) 78 are coupled to an execution cluster(s) 80. The execution cluster(s) 80 includes a set of one or more execution units 82 and a set of one or more memory access circuitries 84. The execution units 82 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform multiple different functions. The scheduler unit(s) 76, physical register file(s) unit(s) 78, and execution cluster(s) 80 are shown as being singular or plural because some processor cores 54 create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster. In the case of a separate memory access pipeline, a processor core 54 for the separate memory access pipeline is the only the execution cluster 80 that has the memory access circuitry 84). It should also be understood that where separate pipelines are used, one or more of these pipelines may be out-of-order issue/execution and the rest perform in-order execution.

The set of memory access circuitry 84 is coupled to the memory unit 60. The memory unit 60 includes a data TLB unit 86 coupled to a data cache unit 88 coupled to a level 2 (L2) cache unit 90. The memory access circuitry 84 may include a load unit, a store address unit, and a store data unit, each of which is coupled to the data TLB unit 86 in the memory unit 60. The instruction cache unit 64 is further coupled to the level 2 (L2) cache unit 90 in the memory unit 60. The L2 cache unit 90 is coupled to one or more other levels of caches and/or to a main memory.

By way of example, the register renaming, out-of-order issue/execution core architecture may implement the pipeline 30 as follows: 1) the instruction fetch unit 68 performs the fetch and length decoding stages 32 and 34 of the pipeline 30; 2) the decode circuitry 70 performs the decode stage 36 of the pipeline 30; 3) the rename/allocator unit 72 performs the allocation stage 38 and renaming stage 40 of the pipeline; 4) the scheduler unit(s) 76 performs the schedule stage 42 of the pipeline 30; 5) the physical register file(s) unit(s) 78 and the memory unit 60 perform the register read/memory read stage 44 of the pipeline 30; the execution cluster 80 performs the execute stage 46 of the pipeline 30; 6) the memory unit 60 and the physical register file(s) unit(s) 78 perform the write back/memory write stage 48 of the pipeline 30; 7) various units may be involved in the exception handling stage 50 of the pipeline; and/or 8) the retirement unit 74 and the physical register file(s) unit(s) 78 perform the commit stage 52 of the pipeline 30.

The processor core 54 may support one or more instructions sets, such as an x86 instruction set (with or without additional extensions for newer versions); a MIPS instruction set of MIPS Technologies of Sunnyvale, CA; an ARM instruction set (with optional additional extensions such as NEON) of ARM Holdings of Sunnyvale, CA). Additionally or alternatively, the processor core 54 includes logic to support a packed data instruction set extension (e.g., AVX1, AVX2), thereby allowing the operations used by multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof, such as a time-sliced fetching and decoding and simultaneous multithreading in INTEL® Hyperthreading technology.

While register renaming is described in the context of out-of-order execution, register renaming may be used in an in-order architecture. While the illustrated embodiment of the processor also includes a separate instruction cache unit 64, a separate data cache unit 88, and a shared L2 cache unit 90, some processors may have a single internal cache for both instructions and data, such as, for example, a Level 1 (L1) internal cache, or multiple levels of the internal cache. In some embodiments, the processor may include a combination of an internal cache and an external cache that is external to the processor core 54 and/or the processor. Alternatively, some processors may use a cache that is external to the processor core 54 and/or the processor.

Figure 3:
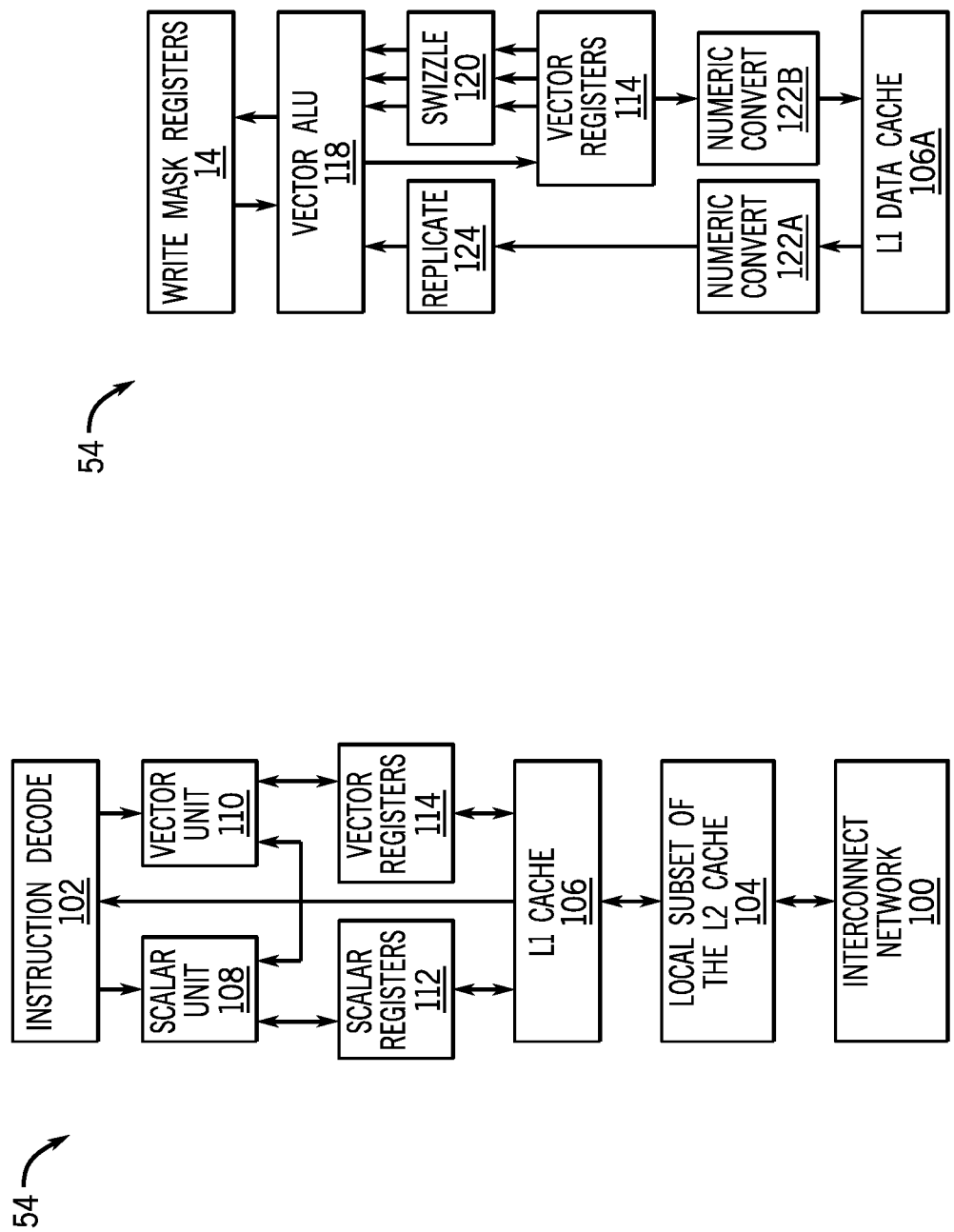
FIGS. 3A and 3B illustrate a block diagram of a more specific exemplary in-order core architecture, which core would be one of several logic blocks (including other cores of the same type and/or different types) in a chip, in accordance with an embodiment of the present disclosure.

FIGS. 3A and 3B illustrate more detailed block diagrams of an in-order core architecture. The processor core 54 includes one or more logic blocks (including other cores of the same type and/or different types) in a chip. The logic blocks communicate through a high-bandwidth interconnect network (e.g., a ring network) with some fixed function logic, memory I/O interfaces, and other I/O logic, depending on the application.

FIG. 3A is a block diagram of a single processor core 54, along with its connection to an on-die interconnect network 100 and with its local subset of the Level 2 (L2) cache 104, according to embodiments of the disclosure. In one embodiment, an instruction decoder 102 supports the x86 instruction set with a packed data instruction set extension. An L1 cache 106 allows low-latency accesses to cache memory into the scalar and vector units. While in one embodiment (to simplify the design), a scalar unit 108 and a vector unit 110 use separate register sets (respectively, scalar registers 112 (e.g., x87 stack 18) and vector registers 114 (e.g., vector registers 12) and data transferred between them is written to memory and then read back in from a level 1 (L1) cache 106, alternative embodiments of the disclosure may use a different approach (e.g., use a single register set or include a communication path that allow data to be transferred between the two register files without being written and read back).

The local subset of the L2 cache 104 is part of a global L2 cache unit 90 that is divided into separate local subsets, one per processor core. Each processor core 54 has a direct access path to its own local subset of the L2 cache 104. Data read by a processor core 54 is stored in its L2 cache 104 subset and can be accessed quickly, in parallel with other processor cores 54 accessing their own local L2 cache subsets. Data written by a processor core 54 is stored in its own L2 cache 104 subset and is flushed from other subsets, if necessary. The interconnection network 100 ensures coherency for shared data. The interconnection network 100 is bi-directional to allow agents such as processor cores, L2 caches, and other logic blocks to communicate with each other within the chip. Each data-path may have a number (e.g., 1012) of bits in width per direction.

FIG. 3B is an expanded view of part of the processor core in FIG. 3A according to embodiments of the disclosure. FIG. 3B includes an L1 data cache 106A part of the L1 cache 106, as well as more detail regarding the vector unit 110 and the vector registers 114. Specifically, the vector unit 110 may be a vector processing unit (VPU) (e.g., a vector arithmetic logic unit (ALU) 118) that executes one or more of integer, single-precision float, and double-precision float instructions. The VPU supports swizzling the register inputs with swizzle unit 120, numeric conversion with numeric convert units 122A and 122B, and replication with replication unit 124 on the memory input. The write mask registers 14 allow predicating resulting vector writes.

Figure 4:
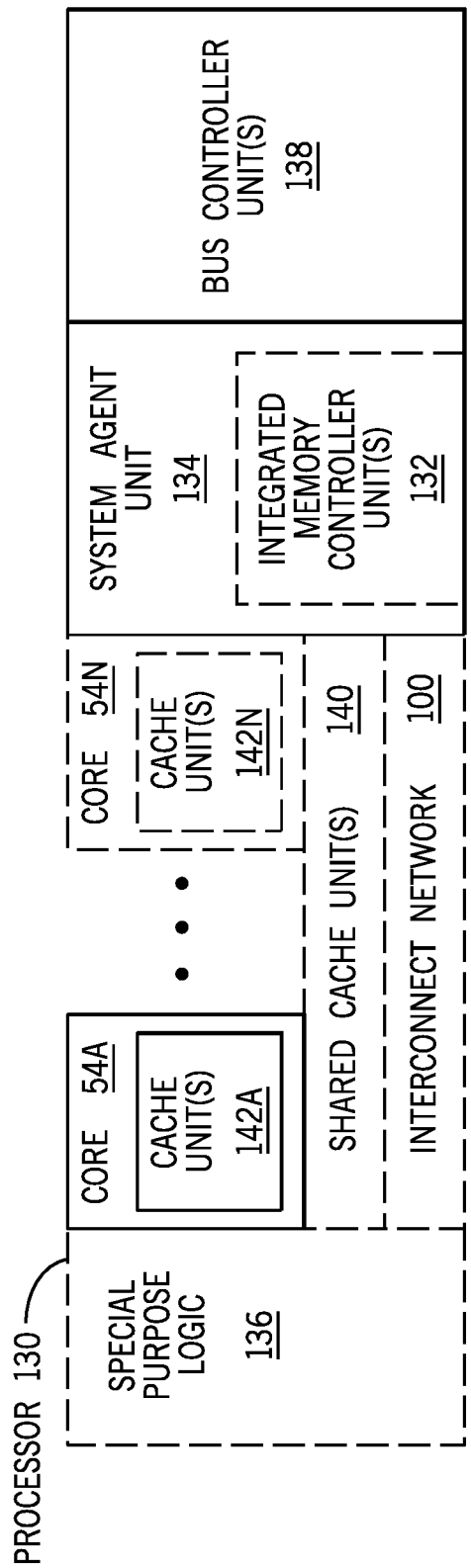
FIG. 4 is a block diagram of a processor that may have more than one core, may have an integrated memory controller, and may have integrated graphics, in accordance with an embodiment of the present disclosure.

FIG. 4 is a block diagram of a processor 130 that may have more than one processor core 54, may have an integrated memory controller unit(s) 132, and may have integrated graphics according to embodiments of the disclosure. The solid lined boxes in FIG. 4 illustrate a processor 130 with a single core 54A, a system agent unit 134, a set of one or more bus controller unit(s) 138, while the optional addition of the dashed lined boxes illustrates the processor 130 with multiple cores 54A-N, a set of one or more integrated memory controller unit(s) 132 in the system agent unit 134, and a special purpose logic 136.

Thus, different implementations of the processor 130 may include: 1) a CPU with the special purpose logic 136 being integrated graphics and/or scientific (throughput) logic (which may include one or more cores), and the cores 54A-N being one or more general purpose cores (e.g., general purpose in-order cores, general purpose out-of-order cores, or a combination thereof); 2) a coprocessor with the cores 54A-N being a relatively large number of special purpose cores intended primarily for graphics and/or scientific (throughput); and 3) a coprocessor with the cores 54A-N being a relatively large number of general purpose in-order cores. Thus, the processor 130 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), an embedded processor, or the like. The processor 130 may be implemented on one or more chips. The processor 130 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 140, and external memory (not shown) coupled to the set of integrated memory controller unit(s) 132. The set of shared cache units 140 may include one or more mid-level caches, such as level 2 (L2), level 3 (L3), level 4 (L4), or other levels of cache, a last level cache (LLC), and/or combinations thereof. While a ring-based interconnect network 100 may interconnect the integrated graphics logic 136 (integrated graphics logic 136 is an example of and is also referred to herein as special purpose logic 136), the set of shared cache units 140, and/or the system agent unit 134/integrated memory controller unit(s) 132 may use any number of known techniques for interconnecting such units. For example, coherency may be maintained between one or more cache units 142A-N and cores 54A-N.

In some embodiments, one or more of the cores 54A-N are capable of multithreading. The system agent unit 134 includes those components coordinating and operating cores 54A-N. The system agent unit 134 may include, for example, a power control unit (PCU) and a display unit. The PCU may be or may include logic and components used to regulate the power state of the cores 54A-N and the integrated graphics logic 136. The display unit is used to drive one or more externally connected displays.

The cores 54A-N may be homogenous or heterogeneous in terms of architecture instruction set. That is, two or more of the cores 54A-N may be capable of execution of the same instruction set, while others may be capable of executing only a subset of a single instruction set or a different instruction set.

Computer Architecture

FIGS. 5-8 are block diagrams of embodiments of computer architectures. These architectures may be suitable for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices. In general, a wide variety of systems or electronic devices capable of incorporating the processor 130 and/or other execution logic.

Figure 5:
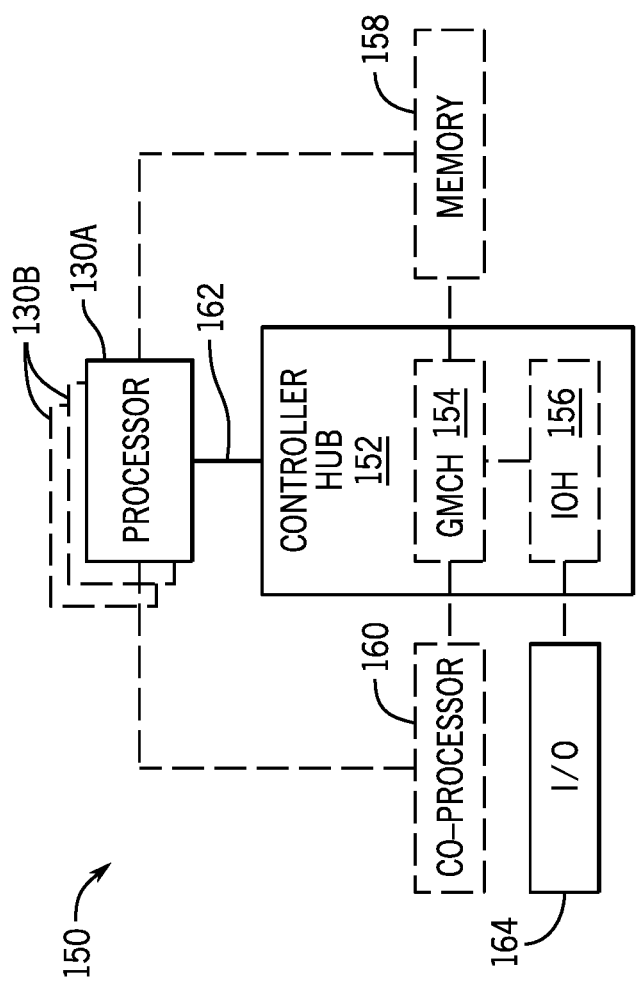
FIG. 5 shown a block diagram of a system, in accordance with an embodiment of the present disclosure.

Referring now to FIG. 5, shown is a block diagram of a system 150 in accordance with an embodiment of the present disclosure. The system 150 may include one or more processors 130A, 130B that is coupled to a controller hub 152. The controller hub 152 may include a graphics memory controller hub (GMCH) 154 and an Input/Output Hub (IOH) 156 (which may be on separate chips); the GMCH 154 includes memory and graphics controllers to which are coupled memory 158 and a coprocessor 160; the IOH 156 couples input/output (I/O) devices 164 to the GMCH 154. Alternatively, one or both of the memory and graphics controllers are integrated within the processor 130 (as described herein), the memory 158 and the coprocessor 160 are coupled to (e.g., directly to) the processor 130A, and the controller hub 152 in a single chip with the IOH 156.

The optional nature of an additional processor 130B is denoted in FIG. 5 with broken lines. Each processor 130A, 130B may include one or more of the processor cores 54 described herein and may be some version of the processor 130.

The memory 158 may be, for example, dynamic random-access memory (DRAM), phase change memory (PCM), or a combination thereof. For at least one embodiment, the controller hub 152 communicates with the processor(s) 130A, 130B via a multi-drop bus, such as a frontside bus (FSB), point-to-point interface such as QuickPath Interconnect (QPI), or similar connection 162.

In one embodiment, the coprocessor 160 is a special-purpose processor, such as, for example, a high-throughput MIC processor, a network or communication processor, a compression engine, a graphics processor, a GPGPU, an embedded processor, or the like. In an embodiment, the controller hub 152 may include an integrated graphics accelerator.

There can be a variety of differences between the physical resources of the processors 130A, 130B in terms of a spectrum of metrics of merit including architectural, micro-architectural, thermal, power consumption characteristics, and the like.

In some embodiments, the processor 130A executes instructions that control data processing operations of a general type. Embedded within the instructions may be coprocessor instructions. The processor 130A recognizes these coprocessor instructions as being of a type that should be executed by the attached coprocessor 160. Accordingly, the processor 130A issues these coprocessor instructions (or control signals representing coprocessor instructions) on a coprocessor bus or other interconnect, to the coprocessor 160. The coprocessor 160 accepts and executes the received coprocessor instructions.

Figure 6:
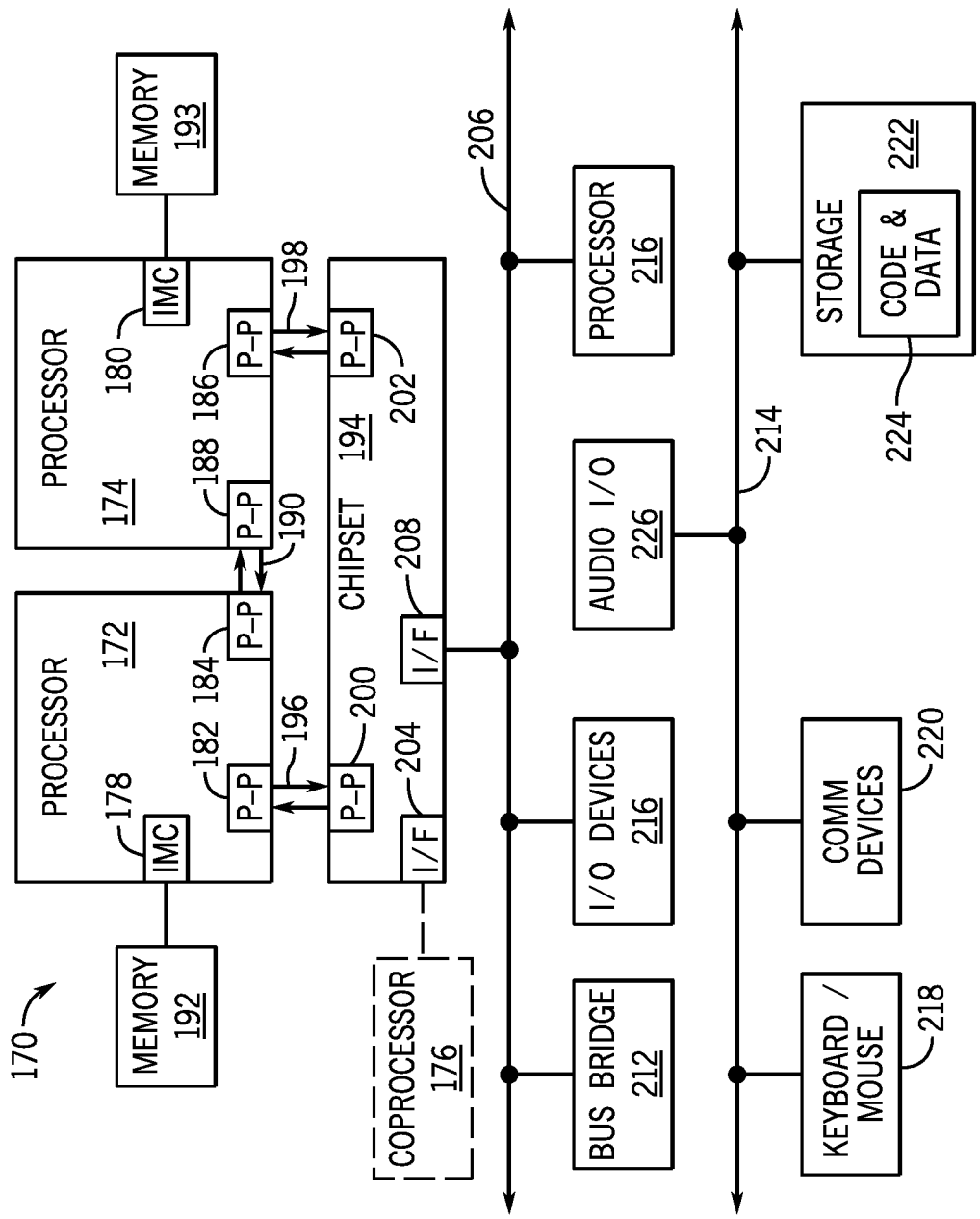
FIG. 6 is a block diagram of a first more specific exemplary system, in accordance with an embodiment of the present disclosure.

Referring now to FIG. 6, shown is a more detailed block diagram of a multiprocessor system 170 in accordance with an embodiment of the present disclosure. As shown in FIG. 6, the multiprocessor system 170 is a point-to-point interconnect system, and includes a processor 172 and a processor 174 coupled via a point-to-point interface 190. Each of processors 172 and 174 may be some version of the processor 130. In one embodiment of the disclosure, processors 172 and 174 are respectively processors 130A and 130B, while coprocessor 176 is coprocessor 160. In another embodiment, processors 172 and 174 are respectively processor 130A and coprocessor 160.

Processors 172 and 174 are shown including integrated memory controller (IMC) units 178 and 180, respectively. The processor 172 also includes point-to-point (P-P) interfaces 182 and 184 as part of its bus controller units. Similarly, the processor 174 includes P-P interfaces 186 and 188. The processors 172, 174 may exchange information via a point-to-point interface 190 using P-P interfaces 184, 188. As shown in FIG. 6, IMCs 178 and 180 couple the processors to respective memories, namely a memory 192 and a memory 193 that may be different portions of main memory locally attached to the respective processors 172, 174.

Processors 172, 174 may each exchange information with a chipset 194 via individual P-P interfaces 196, 198 using point-to-point interfaces 182, 200, 186, 202. Chipset 194 may optionally exchange information with the coprocessor 176 via a high-performance interface 204. In an embodiment, the coprocessor 176 is a special-purpose processor, such as, for example, a high-throughput MIC processor, a network or communication processor, a compression engine, a graphics processor, a GPGPU, an embedded processor, or the like.

A shared cache (not shown) may be included in either processor 172 or 174 or outside of both processors 172 or 174 that is connected with the processors 172, 174 via respective P-P interconnects such that either or both processors' local cache information may be stored in the shared cache if a respective processor is placed into a low power mode.

The chipset 194 may be coupled to a first bus 206 via an interface 208. In an embodiment, the first bus 206 may be a Peripheral Component Interconnect (PCI) bus or a bus such as a PCI Express bus or another third generation I/O interconnect bus, although the scope of the present disclosure is not so limited.

As shown in FIG. 6, various I/O devices 210 may be coupled to first bus 206, along with a bus bridge 212 that couples the first bus 206 to a second bus 214. In an embodiment, one or more additional processor(s) 216, such as coprocessors, high-throughput MIC processors, GPGPUs, accelerators (such as, e.g., graphics accelerators or digital signal processing (DSP) units), field programmable gate arrays, or any other processors, are coupled to the first bus 206. In an embodiment, the second bus 214 may be a low pin count (LPC) bus. Various devices may be coupled to the second bus 214 including, for example, a keyboard and/or mouse 218, communication devices 220 and a storage unit 222 such as a disk drive or other mass storage device which may include instructions/code and data 224, in an embodiment. Further, an audio I/O 226 may be coupled to the second bus 214. Note that other architectures may be deployed for the multiprocessor system 170. For example, instead of the point-to-point architecture of FIG. 6, the multiprocessor system 170 may implement a multi-drop bus or other such architectures.

Figure 7:
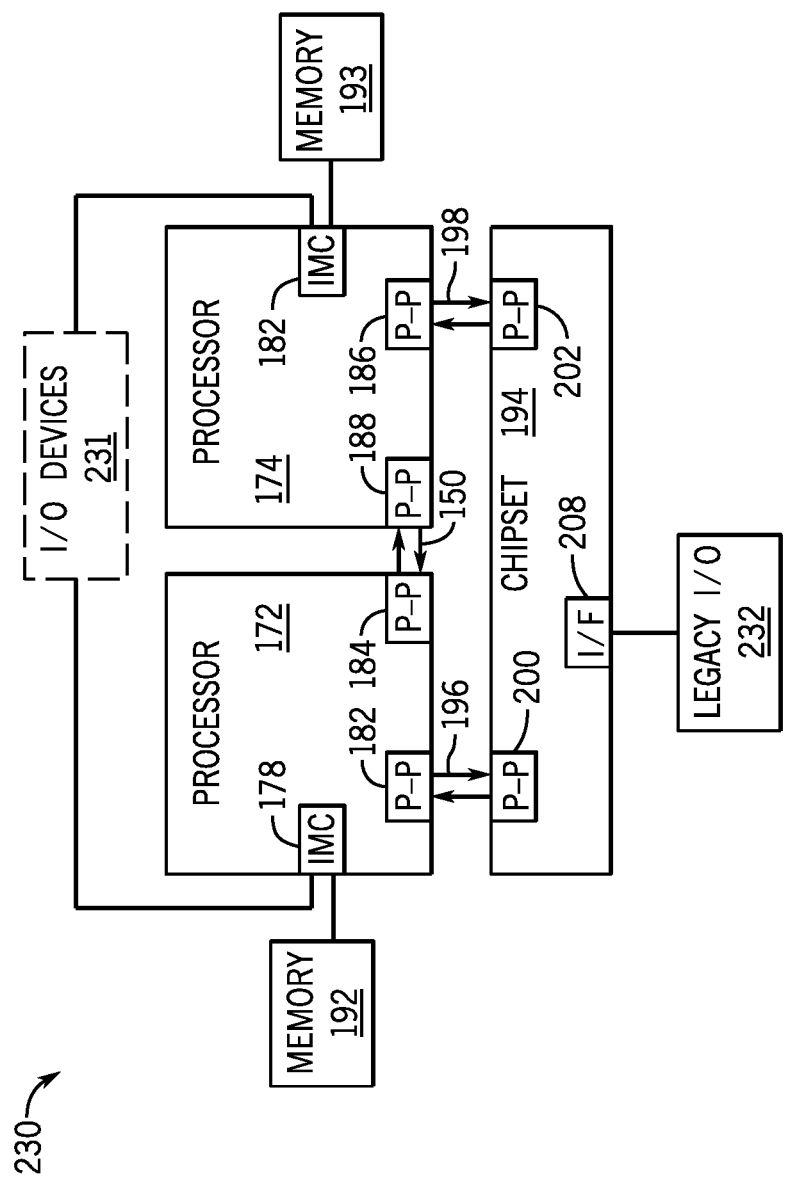
FIG. 7 is a block diagram of a second more specific exemplary system, in accordance with an embodiment of the present disclosure.

Referring now to FIG. 7, shown is a block diagram of a system 230 in accordance with an embodiment of the present disclosure. Like elements in FIGS. 7 and 8 contain like reference numerals, and certain aspects of FIG. 6 have been omitted from FIG. 7 to avoid obscuring other aspects of FIG. 7.

FIG. 7 illustrates that the processors 172, 174 may include integrated memory and I/O control logic ("IMC") 178 and 180, respectively. Thus, the IMC 178, 180 include integrated memory controller units and include I/O control logic. FIG. 7 illustrates that not only are the memories 192, 193 coupled to the IMC 178, 180, but also that I/O devices 231 are also coupled to the IMC 178, 180. Legacy I/O devices 232 are coupled to the chipset 194 via the interface 208.

Figure 8:
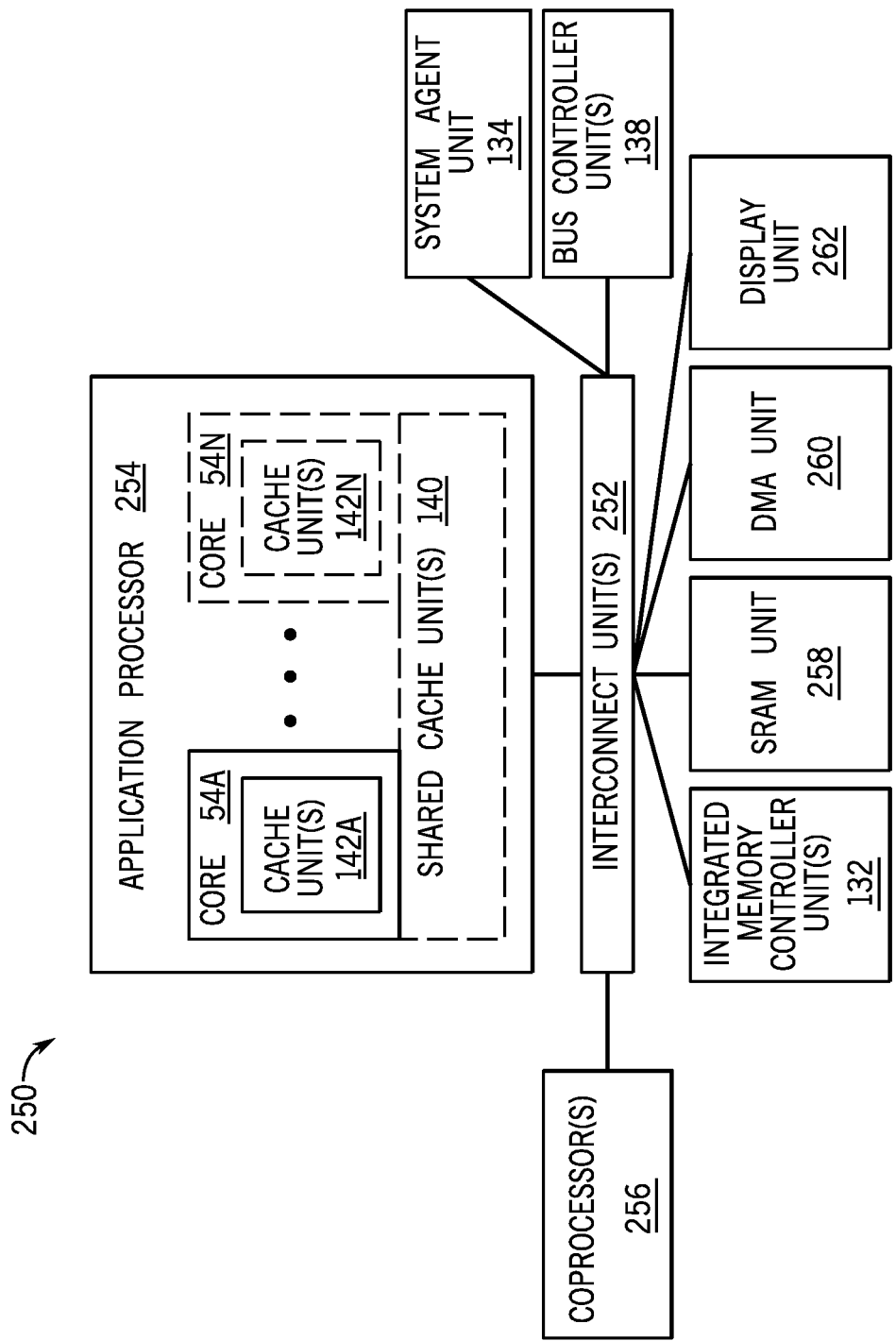
FIG. 8 is a block diagram of a system on a chip (SoC), in accordance with an embodiment of the present disclosure.

Referring now to FIG. 8, shown is a block diagram of a SoC 250 in accordance with an embodiment of the present disclosure. Similar elements in FIG. 4 have like reference numerals. Also, dashed lined boxes are optional features included in some SoCs 250. In FIG. 8, an interconnect unit(s) 252 is coupled to: an application processor 254 that includes a set of one or more cores 54A-N that includes cache units 142A-N, and shared cache unit(s) 140; a system agent unit 134; a bus controller unit(s) 138; an integrated memory controller unit(s) 132; a set or one or more coprocessors 256 that may include integrated graphics logic, an image processor, an audio processor, and/or a video processor; a static random access memory (SRAM) unit 258; a direct memory access (DMA) unit 260; and a display unit 262 to couple to one or more external displays. In an embodiment, the coprocessor(s) 256 include a special-purpose processor, such as, for example, a network or communication processor, a compression engine, a GPGPU, a high-throughput MIC processor, an embedded processor, or the like.

Embodiments of the mechanisms disclosed herein may be implemented in hardware, software, firmware, or a combination of such implementation approaches. Embodiments of the disclosure may be implemented as computer programs and/or program code executing on programmable systems including at least one processor, a storage system (including volatile and non-volatile memory and/or storage elements), at least one input device, and at least one output device.

Program code, such as data 224 illustrated in FIG. 6, may be applied to input instructions to perform the functions described herein and generate output information. The output information may be applied to one or more output devices. For purposes of this application, a processing system includes any system that has a processor, such as, for example, a digital signal processor (DSP), a microcontroller, an application-specific integrated circuit (ASIC), or a microprocessor.

The program code may be implemented in a high-level procedural or object-oriented programming language to communicate with a processing system. The program code may also be implemented in an assembly language or in a machine language. In fact, the mechanisms described herein are not limited in scope to any particular programming language. In any case, the language may be a compiled language or an interpreted language.

One or more aspects of at least one embodiment may be implemented by representative instructions stored on a machine-readable medium that represents various logic within the processor that, when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic cards, optical cards, or any other type of media suitable for storing electronic instructions.

Accordingly, embodiments of the embodiment include non-transitory, tangible machine-readable media containing instructions or containing design data, such as designs in Hardware Description Language (HDL) that may define structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert instructions to one or more other instructions to be processed by the core. The instruction converter may be implemented in software, hardware, firmware, or a combination thereof. The instruction converter may be implemented on processor, off processor, or part on and part off processor.

Figure 9:
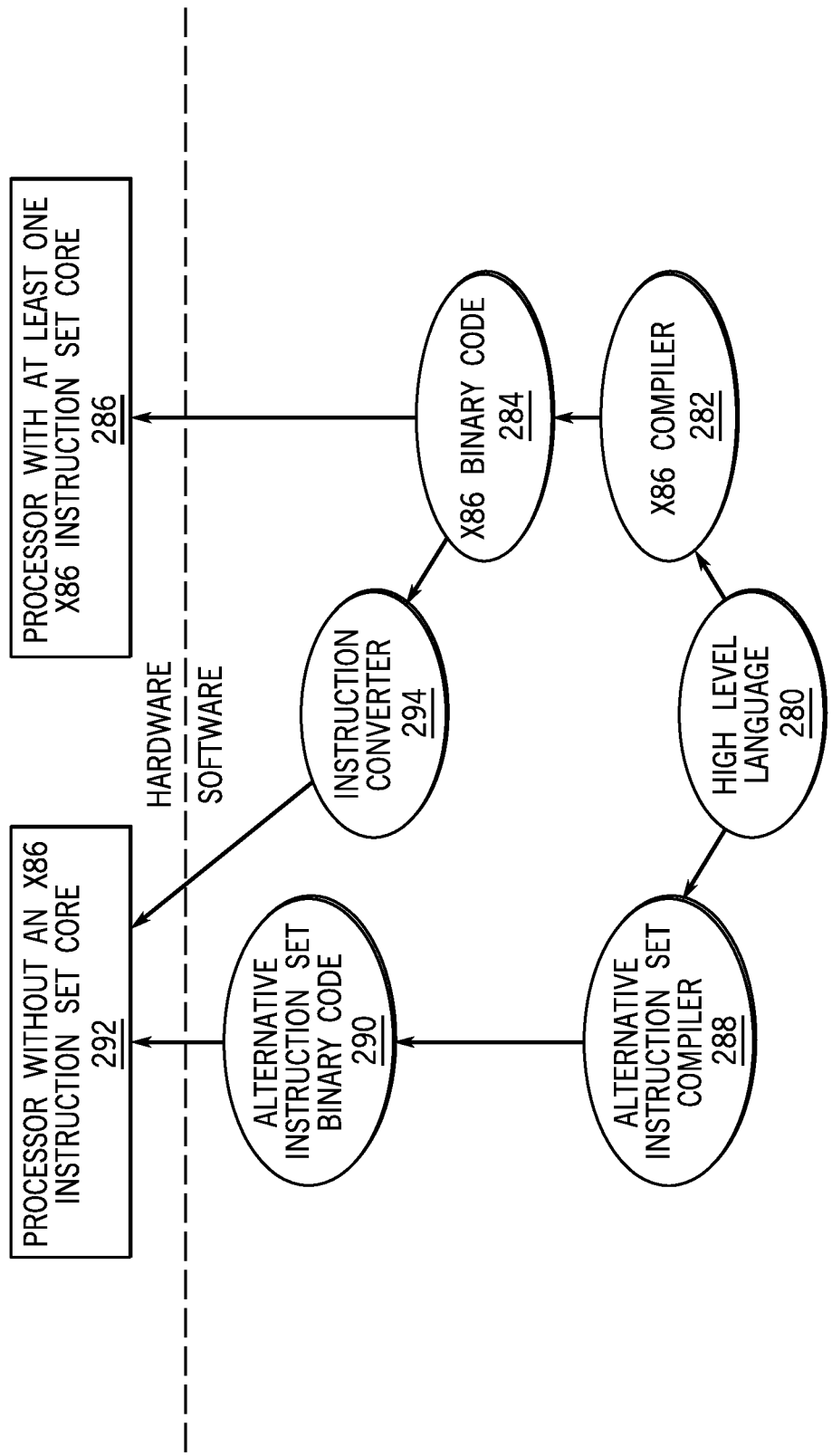
FIG. 9 is a block diagram contrasting the use of a software instruction converter to convert binary instructions in a source instruction set to binary instructions in a target instruction set, in accordance with an embodiment of the present disclosure.

FIG. 9 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or any combinations thereof. FIG. 9 shows a program in a high-level language 280 may be compiled using an x86 compiler 282 to generate x86 binary code 284 that may be natively executed by a processor with at least one x86 instruction set core 286. The processor with at least one x86 instruction set core 286 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 282 represents a compiler that is operable to generate x86 binary code 284 (e.g., object code) that can, with or without additional linkage processing, be executed on the processor with at least one x86 instruction set core 286.

Similarly, FIG. 9 shows the program in the high-level language 280 may be compiled using an alternative instruction set compiler 288 to generate alternative instruction set binary code 290 that may be natively executed by a processor without at least one x86 instruction set core 292 (e.g., a processor with processor cores 54 that execute the MIPS instruction set of MIPS Technologies of Sunnyvale, CA and/or that execute the ARM instruction set of ARM Holdings of Sunnyvale, CA). An instruction converter 294 is used to convert the x86 binary code 284 into code that may be natively executed by the processor without an x86 instruction set core 292. This converted code is not likely to be the same as the alternative instruction set binary code 290 because an instruction converter capable of this is difficult to make; however, the converted code may accomplish the general operation and be made up of instructions from the alternative instruction set. Thus, the instruction converter 294 represents software, firmware, hardware, or a combination thereof that, through emulation, simulation or any other process, allows a processor or other electronic device that does not have an x86 instruction set processor or core to execute the x86 binary code 284.

Initialization of State Components

As previously noted, software running on processors or SoCs may be initialized to an initialization condition of state components (e.g., in a register file) at a time of startup/reset of the processor and/or at a startup of the electronic device that includes the processor. For example, the initialization of the state components may include zeroing out the state components to an initialization condition. Alternatively, the initialization may include writing another preconfigured value (e.g., ones or another value).

The initialization/re-initialization of state components may also be performed for security purposes. For example, during a context switch, operating system (OS) and virtual machine manager (VMM) initialization of extended state components may be used to avoid leakage of state information to a different process/virtual machine without initialize to reset configuration of the state components. Additionally, having residual data from one software thread to another during context switches may give malicious threads access to sensitive data. This vulnerability via residual information may also be present in virtual processors (VP) context switches by the VMM unless the processor initializes to reset configuration state components for the VP context switches.

Additionally or alternatively, the initialization to reset configuration of state components may also be used for performance/power reasons. For example, execution of certain instructions may incur performance penalties if other state components are in a non-initialized state. For example, having dirty (i.e., changed from an initialized state) AVX registers while executing streaming single instruction, multiple data (SIMD) extension (SSE) instructions may take longer to complete than executing the same instructions in a 128-bit AVX version. In such scenarios, higher bits of AVX registers may be put into the initialized state to avoid such performance penalties. Also, persisting any amount of data will consume power. Thus, persisting data that is not used consumes power that may be wasted. To avoid this additional power consumption, the processor may reset to initialization condition for the state components.

Figure 10:
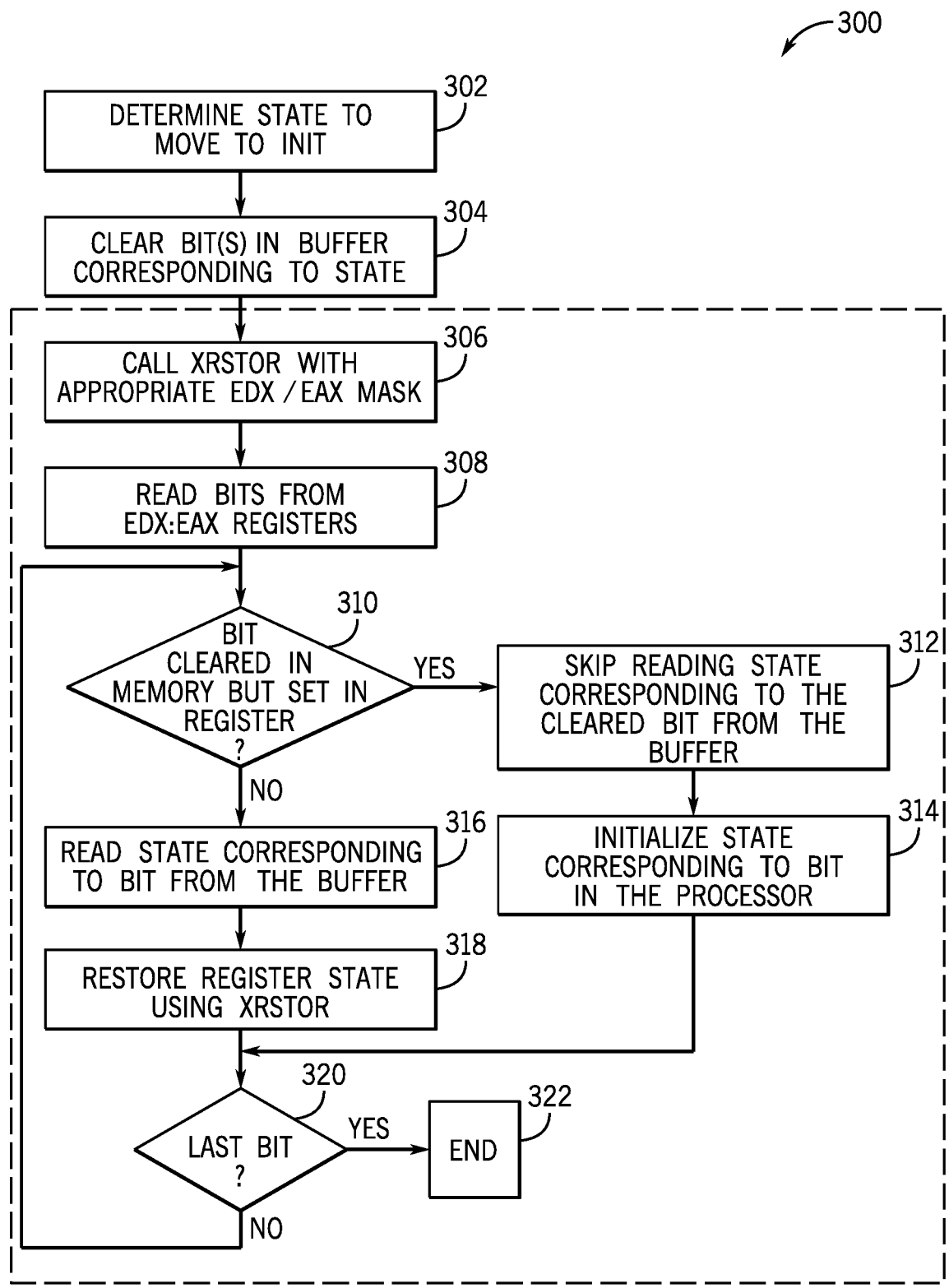
FIG. 10 is a flow diagram of a process for initializing state components of the processors of any of the foregoing figures or the SoC of FIG. 8 using a restore process, in accordance with an embodiment of the present disclosure.

One method to reset to an initialization condition for state components may include using a restore XRSTOR/S (XRSTOR or XRSTORS). FIG. 10 is flow diagram of an embodiment of a process 300 utilizing an XRSTOR/S. As illustrated, the processor determines a state component to move to an initialization condition (INIT) (block 302). For instance, the processor may determine that a 512-bit SIMD instruction (e.g., AVX512) state component is to be reset due to a context switch and/or completion of a process. For each of the state components to be reset to initialization condition for, the processor clears bit(s) in a buffer where the bit(s) correspond to the state component (block 304). For example, if the state component 512-bit SIMD instruction is to be reset, a number/location of bits (e.g., bits 5, 6, and 7) of a buffer (XSTATE_BV) may be cleared to mark the state component 512-bit SIMD instruction to reset to an initialization condition for the state component 512-bit SIMD instruction. The XSTATE_BV filed of the XSAVE header typically is used to write a modified field back to memory. Specifically, if a requested-feature bitmap (RFBM) bit (e.g., RFBM[i]) has a value of 1, the XSAVE writes XSTATE[i] with the value of a corresponding bitmap field of an XINUSE bitmap. XINUSE is a bitmap by which the processor tracks the status of the various state components. For instance, the state component corresponding to bit i of state-component bitmaps is called state component i. Thus, x87 state is state component 0; SSE state is state component 1; AVX state is state component 2; MPX state includes state components 3-4; AVX-512 state includes state components 5-7; PT state is state component 8; PKRU state is state component 9; CET state includes state components 11-12; HDC state is state component 13; and HWP state is state component 16.

With the state components(s) to be initialized/cleared in the buffer, the processor may start an XRSTOR/S process 305. As part of the XRSTOR/S process 305, the processor (e.g., execution unit(s) 82) execute the XRSTOR/S instruction with an appropriate EDX:EAX mask (block 306). The XRSTOR/S includes reading the state component from a previously stored state component using the memory access circuitry 84. The XRSTOR/S utilizes a feature mask that has corresponding bits (e.g., 5, 6, and 7) set indicating which state components are to be read from the memory. The processor (e.g., execution cluster(s) 80) then reads bits from the EDX:EAX (block 308). If the bits are cleared in the memory but set in the register (block 310), the execution unit(s) 82 skip reading the state component corresponding to the cleared bit to restore the state (e.g., 512-bit SIMD instruction) (block 312). Instead of restoring the cleared bits, the execution unit(s) 82 initializes the state corresponding to the bit in the processor (block 314). However, if the bit is not cleared, the execution cluster(s) 80 read a state corresponding to the bit from the buffer (block 316) and restores a register state using the XRSTOR/S (block 318). The execution cluster(s) 80 keeps reading bits until the mask/register has been fully processed (block 320). Once all of the bits have been reviewed/processed, the XRSTOR/S process 305 ends (block 322).

Using the XRSTOR/S may minimize a number of instructions executed to complete the reset to initialization conditions while helping the software remain generic and forward looking. However, since processors access the XSAVE header in memory to identify the state components that are to be initialized, the XRSTOR/S process is relatively expensive (e.g., 100 cycles) to use compared to initializing the state component without a memory call (e.g., 5 cycles). Furthermore, since XRSTOR/S uses memory accesses, it may result in other penalties, such as a translation lookaside buffer miss or a page fault. In some situations (e.g., AMX), a total XSAVE buffer size may extend beyond a page length, causing page faults to become more frequent in such situations.

Figure 11:
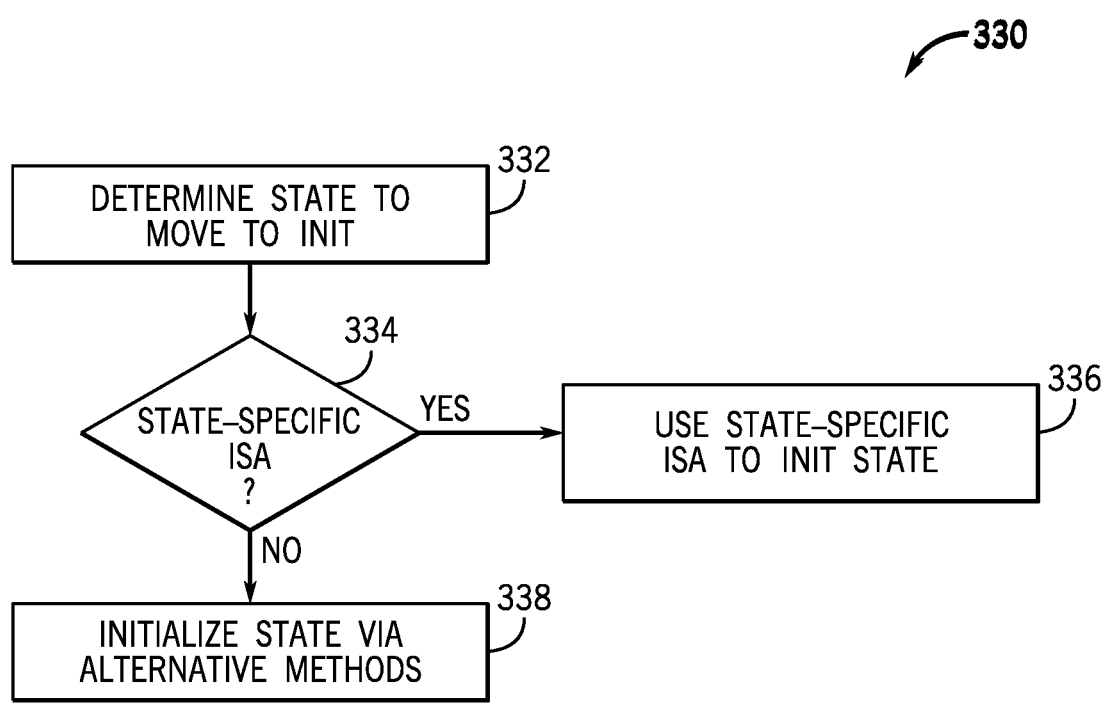
FIG. 11 is a flow diagram of a process for initializing state components of the processors of any of the foregoing figures or the SoC of FIG. 8 using a state-specific instruction-based process, in accordance with an embodiment of the present disclosure.

Additionally or alternatively to using XRSTOR/S to reset to an initialization condition for the state components, state-specific instruction set architecture (ISA) may be used to reset to an initialization condition for a state component if there are supporting instructions to revert the specific state back to INIT. FIG. 11 is a flow diagram of a process 330 that may be used to reset to an initialization condition for a state component. The processor determines a state component to INIT (block 332). For example, the context for the processor or SoC may change or a previous process may have been completed and/or an instruction may be fetched using the fetch stage 32 and/or decoded using the decode circuitry 30. The processor (e.g., the front end 56) determines whether the state component has a state-specific ISA (block 334). If a state-specific ISA exists to reset to an initialization condition for the state component, the processor (e.g., execution unit(s) 82) uses the state-specific ISA to reset to an initialization condition for the specific state (block 336). For example, the software may cause the processor to clear out an AMX TILE using a TILERELEASE instruction to reset to an initialization condition for TILECFG and TILEDATA. Additionally, if the software is to reset the upper bits from 128 and above in the zmm0-zmm15 registers (AVX and partial AVX512 state components), the software may utilize the VZEROUPPER to reset to an initialization condition for those bits while leaving the remaining xmm parts in non-INIT states. If no state-specific ISA is available for the state, the processor may use alternative methods to reset to an initialization condition for the state component (block 338). For example, the processor may utilize XRSTOR/S for the process 300 for such state components that lack the state-specific INIT-causing ISA. In other words, the state-specific ISA-based reset to an initialization condition may be limited to merely a few different state components that have specifically developed instructions leaving a large number of states without such recourse to reset to an initialization condition for the state components other than with memory reads (e.g., using XRSTOR/S). Furthermore, the state-specific ISA-based reset to an initialization condition may be for specific state components without providing flexibility to reset to an initialization condition for multiple state components at the same time with a single instruction.

Figure 12:
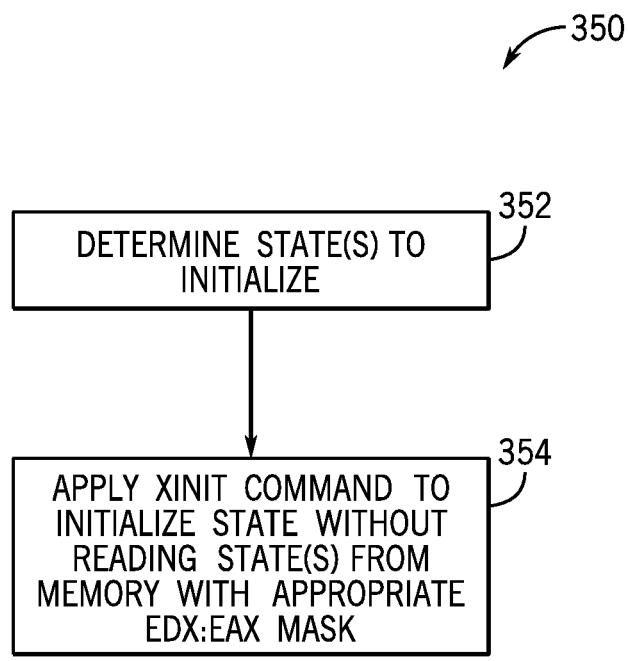
FIG. 12 is a flow diagram of a process for initializing state components of the processors of any of the foregoing figures or the SoC of FIG. 8 using a generic, memory-independent process, in accordance with an embodiment of the present disclosure.

In addition to or alternative to the XRSTOR/S-based INIT or ISA-based INIT techniques, an extended state initialization (XINIT) may be used to reset to an initialization condition for one or more state components without touching memory. The XINIT command may begin in response to a particular event, such as a change in context for processes in OSes or VMMs. FIG. 12 is a flow diagram of a process 350 illustrating the XINIT being used to reset to an initialization condition for state components. The processor determines one or more state components to initialize (block 352). For instance, the decode circuitry 30 and/or the execution unit(s) 82 may decode which state components are to be reset to an initialization condition. The processor (e.g., the execution unit(s) 82) then applies the XINIT to initialize state components without reading any state components from memory with an appropriate EDX:EAX mask (block 354). Additionally or alternatively, the XINIT may be applied with another mask. Furthermore, the XINIT may not be limited only to specific state components that have state-specific ISA-based INIT instructions and may not be limited to reset to an initialization condition for only an individual state component. Instead, XINIT may provide a generic interface for applying INIT to multiple state components without state-specific instructions and without reading the state components from the memory as is done in the XRSTOR/S-based INIT techniques.

Figure 13:
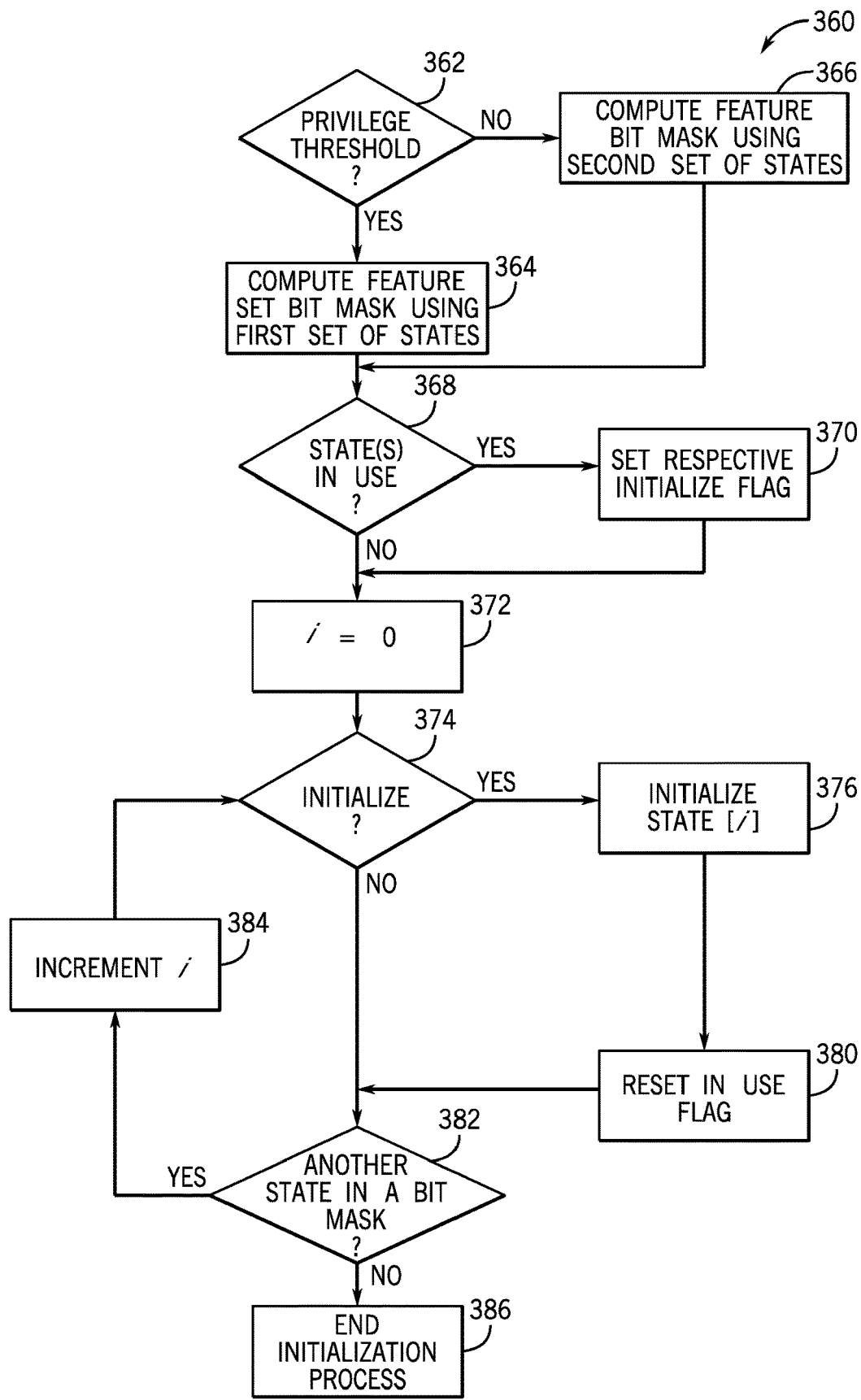
FIG. 13 is a flow diagram illustrating a more detailed view of the process of FIG. 12, in accordance with an embodiment of the present disclosure.

FIG. 13 is a flow diagram of a process 360 showing a detailed view of an embodiment to reset to an initialization condition for one or more state components using XINIT. As illustrated, as part of the initialization using XINIT, the processor (e.g., the execution unit(s) 82) determines whether a current privilege level is greater than a threshold level (block 362). The determination may be made in response to an indication that initialization is to occur based on decoding in a decode unit, such as the decode circuitry 36. If the current privilege level is greater than a threshold, the processor (e.g., the execution unit(s) 82) computes a feature bit mask for a first set of state components (block 364). The feature bit mask may be set using the first set of state components corresponding to user and supervisor states. For instance, the first set of states may be set using an AND operation between results of an OR operation (e.g., between global use states OR global use supervisor states) and bits in certain registers (e.g., EDX:EAX). If the current privilege level is not greater than the threshold, the processor (e.g., the execution unit(s) 82) computes the feature bit mask for a second set of state components (block 366). The feature bit mask may be set using the first set of state components corresponding only to user states. For instance, the second set of state components may include an AND operation between bits in certain registers (e.g., EDX:EAX) and the global use states without the global use supervisor states. In other words, regardless of set used, the certain registers may be used to specify the state components to reset to an initialization condition that are also checked against the current privilege level and stored in a bit mask.

The processor (e.g., the execution unit(s) 82) then checks the state components specified in the bit mask for whether the corresponding states are in use (block 368). In other words, the processor checks to see whether the respective state component has been flagged as in use. The in-use flag indicates that some change has been made so that the state is "dirty" and different than an INIT condition. For the states that are in use, the processor (e.g., the execution unit(s) 82) sets a respective initialize flag for the state to indicate that the state is to be initialized (block 370). Otherwise, the initialize flag remains unchanged.

The processor initializes an index (i=0) to check a first state component corresponding to a first bit of the bit mask (block 372). The processor (e.g., the execution unit(s) 82) checks the first initialize flag to determine whether the first state component is to be initialized (block 374). If the initialize flag has been set, the processor (e.g., the execution unit(s) 82) initializes the state component corresponding to the initialize flag (block 376). If the initialization flag has not been set, the state component is not initialized. If the state component is set to be initialized, the processor (e.g., the execution unit(s) 82) resets the in-use flag (block 380).

After the initialization of the state component has been performed or skipped, the processor (e.g., the execution unit(s) 82) may determine whether there are any other bits in the bit mask corresponding to other state components that have not been processed yet (block 382). In other words, the processor (e.g., the execution unit(s) 82) determines whether the last bit in the bit mask been reached. If any bits remain, the index is incremented (block 384). On the next state component, the processor checks for the initialization flag and performs the previously discussed steps on the next state component. If no other state components are indicated in the bit mask, the processor (e.g., the execution unit(s) 82) may end the initialization process (block 386). In some embodiments, the execution of the foregoing techniques in the foregoing blocks may be implemented using the physical register file(s) 78, the execution unit(s) 82, and decode circuitry 70. The foregoing discussion related to the process 360 may be implemented using any suitable techniques. For instance, an implementation of XINIT may be made using the following pseudocode in Table 1.

TABLE 1

| XINIT Pseudocode |
| --- |
| IF CPL = 0<br>    RFBM := (XCR0 OR IA32_XSS) AND EDX:EAX<br>ELSE<br>    RFBM := (XCR0) AND EDX:EAX<br>FI;<br>TO_BE_INITIALIZED = RFBM AND XINUSE<br>FOR i := 0 TO 62<br>    IF TO_BE_INITIALIZED[i] = 1<br>    THEN<br>        INIT state component i<br>        XINUSE[i] := 0*<br>    FI;<br>ENDFOR; |

As noted previously, XRSTOR/S may be a generic method that may be used by system software to reset to an initialization condition for state components, but XRSTOR/S involves memory accesses increasing the cost to reset to an initialization condition for the state components.

XINIT is a much faster solution which may be used to directly place any state in the INIT state. Thus, XINIT provides a scalable solution for future and existing states without having state-specific instructions to reset to an initialization condition for these states. Furthermore, XINIT may be used to ensure that the in-use flag for initialized states is up-to-date unlike state-specific ISAs that may leave the in-use flag in a stale or incorrect state.

XINIT, once enabled in system software/libraries, may provide a mechanism to reset to an initialization condition for any number of state components for any relevant software flows without using any specific enablement (e.g., development and deployment of state-specific ISAs) for any future states or current states that do not have state-specific ISAs. XINIT also eliminates the use of state-specific instructions to reset to an initialization condition for states thereby saving vital opcode lookup and opcode storing in general in the processor architecture.

Additionally, as previously discussed, XINIT is memory independent. As previously discussed, executing an XRSTOR/S may be relied upon for state components that do not have a state-specific ISA. However, the XRSTOR/S has a memory dependency that may result in a bottleneck. Additionally, the save area memory page may be paged out at the time of XRSTOR/S creating additional issues in the application of XRSTOR/S-based INIT. The system software usually makes sure that the pages are allocated on non-pageable memory, but user space programmers may see page-faults while trying to reset to an initialization condition for state components via XRSTOR/S. XINIT does not have these drawbacks due to it memory independency.

XINIT may have applicability in numerous applications, such as within an OS, a VMM, and/or user space. Firstly, XINIT has a clear advantage for VMM. During VP switches or global state modification by a guest VM, the VMM may disable certain features. Any features previously in use would remain dirty and affect the power/performance of the VM. To avoid this situation, VMM may clear the state using XINIT instead of XRSTOR/S or state component-specific ISA. Since, absent XINIT, the VMM may be unable to reset to an initialization condition for some state components (e.g., AVX512 (i.e., zmm16-zmm41)) without also causing other state components to reset to an initialization condition, XRSTOR/S may be used to perform selective INIT processes. However, as previously noted, XRSTOR/S is costly in power and performance (e.g., 100 cycles). XINIT enables the VMM to reset state components to an initialization condition in a fraction (e.g., 5%) of the time used for XRSTOR/S.

Within an OS, the OS does not use extended state components in ring 0 (highest protection ring or other protection ring above a threshold) executions, but ring 0 code may still incur a penalty due to dirty state components in the processor unless the OS puts the state components into INIT before execution of the ring 0 code. XINIT could be used at the start of system-calls and interrupts after saving the extended states. By performing XINIT prior to executing the ring 0 code, the OS may avoid power/performance penalties incurred by the processor while executing the ring 0 code.

XINIT may be extended to user space via an intrinsic OS operations or an OS API, where XINIT may be used to clear the extended state components once the user-space thread is done using the extended state components. By doing so, the thread may avoid power/performance penalties incurred by the processor due to state components being put back to INIT via XRSTOR/S.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended example embodiments.

The techniques presented and example embodimented herein are referenced and applied to material objects and concrete examples of a practical nature that demonstrably improve the present technical field and, as such, are not abstract, intangible or purely theoretical. Further, if any example embodiments appended to the end of this specification contain one or more elements designated as "means for [perform]ing [a function] . . . " or "step for [perform]ing [a function] . . . ", it is intended that such elements are to be interpreted under 35 U.S.C. 112(f). However, for any example embodiments containing elements designated in any other manner, it is intended that such elements are not to be interpreted under 35 U.S.C. 112(f).

EXAMPLE EMBODIMENTS

The following numbered clauses define certain example embodiments of the present disclosure.

EXAMPLE EMBODIMENT 1. A processor comprising:
a register to track usage of state components of the processor;
a decode unit to decode a state initialization instruction, wherein the state initialization instruction indicates the state components are to be initialized by zeroing out the state components; and
an execution unit coupled with the decode unit, wherein the execution unit, in response to the state initialization instruction, is to initialize the state components without reading another state component from memory as part of the initialization.

EXAMPLE EMBODIMENT 2. The processor of example embodiment 1, wherein the execution unit, in response to the state initialization instruction, does not initialize the other state component as part of the initializing the state components.

EXAMPLE EMBODIMENT 3. The processor of example embodiment 1, wherein the execution unit, in response to the state initialization instruction, does not use state-specific instruction sets for the state components to perform the initialization.

EXAMPLE EMBODIMENT 4. The processor of example embodiment 1, wherein the execution unit does not perform a restore instruction to complete the initialization.

EXAMPLE EMBODIMENT 5. The processor of example embodiment 1, wherein initializing the state components by the execution unit comprises:
determining that a state component of the state components is in use by checking an in-use flag for the state component; and
in response to determining that the state component is in use, setting an initialization flag indicating that the state component is to be initialized.

EXAMPLE EMBODIMENT 6. The processor of example embodiment 5, wherein initializing comprises, after initialization:
determining that the state component has been initialized; and in response to the determination that the state component has been initialized, clearing an in-use flag for the state component.

EXAMPLE EMBODIMENT 7. The method of example embodiment 1, wherein initializing comprises initializing the state components without accessing memory to read any contents of any stored state components.

EXAMPLE EMBODIMENT 8. A method comprising:
determining that a plurality of state components for a processor is to be initialized;
storing indications of the plurality of state components in a bit mask;
determining whether the plurality of state components are in use;
for the plurality of state components that are in use, mark the respective state component as to be initialized based at least in part on an in-use condition of the respective state component; and
initialize the state components in the bit mask based at least in part on the to-be-initialized marking.

EXAMPLE EMBODIMENT 9. The method of example embodiment 8 comprising determining whether a current privilege exceeds a privilege threshold.

EXAMPLE EMBODIMENT 10. The method of example embodiment 9, wherein determining that the plurality of state components comprises setting the bit mask for a first set of state components based on the current privilege exceeding the privilege threshold.

EXAMPLE EMBODIMENT 11. The method of example embodiment 10, wherein determining that the plurality of state components comprises setting the bit mask for a second set of state components based on the current privilege not exceeding the privilege threshold.

EXAMPLE EMBODIMENT 12. The method of example embodiment 11, wherein the first set of state components comprises global use supervisor states, and the second set of state components does not.

EXAMPLE EMBODIMENT 13. The method of example embodiment 8, wherein the in-use condition indicates that the respective state component has changed from an initialization state.

EXAMPLE EMBODIMENT 14. The method of example embodiment 13 comprising determining the in-use condition indicates that the respective state contains a value other than zero.

EXAMPLE EMBODIMENT 15. The method of example embodiment 13 comprising clearing at least a portion of an in-use bitmap indicating the in-use condition once the respective state is initialized.

EXAMPLE EMBODIMENT 16. A system to process instructions comprising:
a register to track usage of state components of the system;
a decode unit to decode a state initialization instruction, wherein the state initialization instruction indicates that one or more of the state components are to be initialized; and
an execution unit coupled with the decode unit, wherein the execution unit, in response to the state initialization instruction, is to:
set a bit mask for the one or more state components in the register;
determining whether the one or more state components have changed from an initialized state based at least in part on in-use bitmap used to track the status of respective state components of the one or more state components;
for the one or more state components that have changed from the initialized state, setting initialize flags for the one or more state components;
initializing the one or more state components that have set initialize flags; and
clearing the in-use state components for the initialized state components.

EXAMPLE EMBODIMENT 17. The system of example embodiment 16, wherein setting the bit mask is based at least in part on a current privilege level in use in the system.

EXAMPLE EMBODIMENT 18. The system of example embodiment 17, wherein the register comprises a requested-feature bitmap.

EXAMPLE EMBODIMENT 19. The system of example embodiment 18, wherein the requested-feature bitmap is set using a logical AND of one or more registers with global user and supervisor states when a current privilege level is above a threshold.

EXAMPLE EMBODIMENT 20. The system of example embodiment 19, wherein the requested-feature bitmap is set using a logical AND of the one or more registers with global user states when the current privilege level is below a threshold.

What is claimed is:

1. A processor comprising:
a register to track usage of state components of the processor;
a decode unit to:
decode a state initialization instruction, wherein the state initialization instruction indicates that the state components are to be initialized by zeroing out the state components; and
determine whether a current privilege exceeds a privilege threshold and set a bit mask based at least in part on the current privilege exceeding the privilege threshold; and
an execution unit coupled with the decode unit, wherein the execution unit, in response to the state initialization instruction, is to initialize the state components based on the bit mask and without reading another state component from memory as part of the initialization.

2. The processor of claim 1, wherein the execution unit, in response to the state initialization instruction, does not initialize the another state component as part of the initializing the state components.

3. The processor of claim 1, wherein the execution unit, in response to the state initialization instruction, does not use state-specific instruction sets for the state components to perform the initialization.

4. The processor of claim 1, wherein the execution unit does not perform a restore instruction to complete the initialization.

5. The processor of claim 1, wherein initializing the state components by the execution unit comprises:
determining that a state component of the state components is in use by checking an in-use flag for the state component; and
in response to determining that the state component is in use, setting an initialization flag indicating that the state component is to be initialized.

6. The processor of claim 5, wherein initializing comprises, after initialization:
determining that the state component has been initialized; and
in response to the determination that the state component has been initialized, clearing an in-use flag for the state component.

7. The processor of claim 1, wherein initializing comprises initializing the state components without accessing memory to read any contents of any stored state components.

8. A method comprising:
determining that a plurality of state components for a processor is to be initialized by zeroing out the state components;
determining whether a current privilege exceeds a privilege threshold;
storing indications of the plurality of state components in a bit mask, wherein storing the indications in the bit mask for a first set of state components is based at least in part on whether the current privilege exceeds the privilege threshold;
determining whether the plurality of state components are in use;
for the plurality of state components that are in use, marking the respective state component as to be initialized based at least in part on an in-use condition of the respective state component; and
initializing the state components in the bit mask based at least in part on the to-be-initialized marking.

9. The method of claim 8, wherein determining that the plurality of state components comprises setting the bit mask for a second set of state components based on the current privilege not exceeding the privilege threshold.

10. The method of claim 9, wherein the first set of state components comprises global use supervisor states, and the second set of state components does not.

11. The method of claim 8, wherein the in-use condition indicates that the respective state component has changed from an initialization state.

12. The method of claim 11 comprising determining the in-use condition indicates that the respective state contains a value other than zero.

13. The method of claim 11 comprising clearing at least a portion of an in-use bitmap indicating the in-use condition once the respective state is initialized.

14. A system to process instructions comprising:
a register to track usage of state components of the system;
a decode unit to decode a state initialization instruction, wherein the state initialization instruction indicates that one or more of the state components are to be initialized by zeroing out the state components; and
an execution unit coupled with the decode unit, wherein the execution unit, in response to the state initialization instruction, is to:
set a bit mask for the one or more state components, wherein setting the bit mask is based at least in part on a current privilege level in use in the system;
determine whether the one or more state components have changed from an initialized state based at least in part on in-use bitmap used to track the status of respective state components of the one or more state components;
for the one or more state components that have changed from the initialized state, set initialize flags for the one or more state components;
initialize the one or more state components that have set initialize flags; and
clear the in-use state components for the initialized state components.

15. The system of claim 14, wherein the register comprises a requested-feature bitmap.

16. The system of claim 15, wherein the requested-feature bitmap is set using a logical AND of one or more registers corresponding to global user and supervisor states when a current privilege level is above a threshold.

17. The system of claim 16, wherein the requested-feature bitmap is set using a logical AND of the one or more registers corresponding to global user states when the current privilege level is below a threshold.

* * * * *